US009686913B2

(12) United States Patent
Foster et al.

(10) Patent No.: US 9,686,913 B2
(45) Date of Patent: Jun. 27, 2017

(54) SYSTEM AND METHOD FOR AUTOMATICALLY UPDATING ESTIMATED YIELD VALUES

(71) Applicant: CNH America LLC, New Holland, PA (US)

(72) Inventors: Christopher A. Foster, Denver, PA (US); Justin R. Ringwald, Ellinwood, KS (US); Douglas S. Fitzkee, Ephrata, PA (US); Kevin S. Richman, Plainfield, IL (US); Jesse H. Orsborn, Warsaw, MO (US); Thomas H. Brown, Jr., Reinholds, PA (US); John H. Posselius, Ephrata, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 1008 days.

(21) Appl. No.: 13/903,624

(22) Filed: May 28, 2013

(65) Prior Publication Data

US 2014/0358466 A1    Dec. 4, 2014

(51) Int. Cl.
*A01D 41/127*    (2006.01)
*A01D 46/08*    (2006.01)

(52) U.S. Cl.
CPC ......... *A01D 41/127* (2013.01); *A01D 46/084* (2013.01)

(58) Field of Classification Search
CPC ........................... A01D 41/127; A01D 46/084
See application file for complete search history.

(56) References Cited

U.S. PATENT DOCUMENTS

| 6,536,197 | B1 * | 3/2003 | Covington | ............ B30B 9/3082 100/178 |
| 6,820,459 | B2 | 11/2004 | Beck et al. | |
| 7,073,314 | B2 | 7/2006 | Beck et al. | |
| 7,650,734 | B2 | 1/2010 | Beck et al. | |
| 2004/0050138 | A1 * | 3/2004 | Beck | ................... G01F 25/0007 73/1.16 |
| 2005/0217510 | A1 * | 10/2005 | Covington | .......... A01F 15/0825 100/88 |
| 2007/0185672 | A1 | 8/2007 | Anderson et al. | |

OTHER PUBLICATIONS

PCT/US2014/010977—International Search Report and Written Opinion dated Apr. 16, 2014, 9 pages.

* cited by examiner

*Primary Examiner* — Mischita Henson
(74) *Attorney, Agent, or Firm* — Boyle Fredrickson, S.C.

(57) ABSTRACT

System and method which automatically updates estimated field and in-transit yield values as a function of estimated vehicle load values and correction values determined from more accurate yield values obtained later, such as at a processing or other receiving facility, thereby providing better estimates of yield values between yield monitor system calibrations.

18 Claims, 6 Drawing Sheets

SYSTEM AND METHOD FOR AUTOMATICALLY UPDATING ESTIMATED YIELD VALUES

TECHNICAL FIELD

This invention relates generally to a system and method for determining yield values for harvesting machines that produce discrete packaged harvested products, such as but not limited to, cotton harvesters with on-board packagers or module builders, and more particularly to a system and method which automatically updates estimated field and in-transit yield values as a function of estimated vehicle load values and correction values determined from more accurate yield values obtained later, such as at a processing or other receiving facility, to provide better estimates of yield values between yield monitor system calibrations.

BACKGROUND ART

As exemplary harvesting machines having an on-board packaging capability for the purposes of explaining the present invention, cotton harvesters including on-board cotton module builders or packagers are typically used to create cotton modules having a generally rectangular shape, conforming to specific dimensions to facilitate handling and transporting on dedicated transport vehicles and processing by gins. The most accepted and recognized of the known on-board cotton module builders utilize an accompanying unloading door or ramp, which unfolds as the cotton module builder is tilted, for providing a continuous, level surface extending from the floor of the builder to the ground or other surface onto which the cotton module is to be unloaded. The cotton module is moved along the ramp by a suitable driver system which may include one or more powered drag chains, belts, rollers, or the like.

Often the cotton modules are unloaded by the harvester in or near the swath of field from which the cotton was harvested. Also commonly, at a later time a transport vehicle with a holding area and loading and unloading structure collects the cotton modules and transports them from their various locations in the field and unloads them at another location to await transport to a storage location, or cotton gin or processing facility for further processing, or unloads them at the gin or processing facility. It is not uncommon for a cotton module to be transported several times prior to reaching the gin.

It is desirable to be able to record, correlate, and analyze information associated with a crop at various phases of production, such as planting, growing, harvesting, transporting, processing, or classifying, for analysis and use in decision making and valuation for the current season and future seasons. One crop attribute of particular importance is yield value, or quantity of crop harvested from a particular area, e.g. kilograms/hectare, pounds/acre, metric tons/hectare, bushels/acre, and the like. An accurate cotton yield monitor system on or associated with the harvester can provide information that is useful to keep track of yields on-the-go, e.g., while harvesting and in-transit, for instance, for planning drop-off and collection locations for completed modules. The typical yield monitor system includes a sensor or group of sensors installed on the vehicle, provides estimated yield data based on sensed conditions, and if it generates reasonably accurate yield data, is valuable to dynamically measure spatial yield variability for developing yield maps of a field. However, it is understood that yield maps will only be as accurate as the yield data inputs. Also, by observing and analyzing the yield variability across a field, in-field harvester adjustments can be made to improve present yield and informed decisions made to improve future productivity.

As is evident, the accuracy of the yield monitor system is very important in this process. But the accuracy of the system must be considered in light of the measurement sample. For example, instantaneous accuracy refers to the accuracy of each measured data point, load accuracy refers to the accuracy for a load or a specified number of cotton modules, and field accuracy refers to the accuracy of the yield monitor during the harvest of the entire field. Shortcomings include that instantaneous accuracy is difficult to measure, and field accuracy may be misleading because measurement errors in opposite directions tend to average out, possibly creating a misleading measure of accuracy for the field monitor system. Therefore, there is a tendency to use the measured quantity, mass, or weight of a load (e.g. kilograms, pounds, tons, bushels, etc) when determining if, and when, the yield monitor system needs to be calibrated.

As one known manner to determine load accuracy, a load of cotton is harvested and packaged, e.g., into a discrete module, and once processed, the yield monitor information for that package is compared with the more accurately measured yield data from the gin or processing or receiving facility. There is obviously an inherent delay between harvesting and receiving gin data to calibrate the yield monitor. In the interim, a significant amount of cotton may have been harvested and packaged with yield data collected using an improperly calibrated yield monitor. As a consequence, during this time any in-field decisions were based on inaccurate data.

Efforts to eliminate the time delay include using a measuring or sensing device in the field, e.g., a scale. In this scenario, a load or package of cotton is loaded into or onto the sensing device and measured. The yield monitor information is compared with the sensing device information. Based on the result of the comparison, the yield monitor information may be modified and/or the yield monitor system may be calibrated. An advantage of this process is that it reduces the time delay associated with the data comparison. As a disadvantage, it adds a harvesting delay and increases the labor and equipment costs. It also adds a possible source of error or errors in the measuring or sensing device.

A significant consequential problem that can be created is that this new source of error may be difficult or impossible to discern from the yield monitor system errors. For example, one source of error in the yield monitor system is the build-up of dust, residue, or lint on optical sensors associated with the picker chutes of a harvester. If the sensors become partially blocked or fully blocked, the flow rates measured thereby will include inaccuracy. In addition, this inaccuracy may increase gradually as the harvester is moving through the field or it may suddenly clear after the harvester passes over uneven terrain and the build-up on the sensors falls away, or the sensor is cleaned.

Accordingly, what is sought is a system and method for automatically updating estimated yield values and improving the accuracy of a yield monitor system, which overcomes at least one of the problems, shortcomings or disadvantages as set forth above.

SUMMARY OF THE INVENTION

What is disclosed is a system and method for automatically updating estimated yield values and improving the accuracy of a yield monitor system, which overcomes at least one of the problems, shortcomings or disadvantages as set forth above.

A system for automatically correcting yield values of a yield monitoring system of a harvesting vehicle between calibrations of the monitoring system includes a harvesting vehicle and at least one transport vehicle, each including a holding area for receiving or holding packages of harvested crop and a transport structure configured to load or unload the packages. The harvesting vehicle includes a yield monitor system calibrated as a function of at least one crop related parameter and configured to determine a yield value automatically therefor. The system also includes a load sensing apparatus associated with at least one of the vehicles which is configured to determine weight or load values of the packages, respectively.

According to the invention, a control system monitors the yield value determined by the yield monitor system and the weight or load value determined by the load sensing apparatus for a designated at least one of the packages, to determine a yield value correction factor as a function thereof. The yield correction factor is applied to the yield value for packages harvested after the at least one designated package.

Subsequently the control system receives and monitors yield data generated by another apparatus for the at least one designated package and determines a load value correction factor as a function of the load value and the yield data. The load value correction factor is applied to the load value for packages harvested after the at least one designated package until the load sensing apparatus or the yield monitor system is subsequently calibrated.

According to a preferred feature of the invention, a first yield value comprises the yield value after applying the yield value correction factor, a first load value comprises the load value after applying the load correction factor, and a second yield value comprises the first yield value after applying the load correction factor. These values can be used to analyze performance of vehicle hardware and software.

According to a preferred aspect of the invention, the load sensing apparatus is associated with the holding area of at least one of the vehicles.

According to another preferred aspect of the invention, the load sensing apparatus is associated with the transport structure of at least one of the vehicles.

According to another preferred feature of the invention, the load value correction factor is determined for each vehicle including load sensing apparatus and the load value correction factor is applied to the load values of each vehicle, respectively.

According to yet another preferred feature of the invention, a designated load value correction factor associated with a designated load sensing apparatus is applied to the yield value.

According to yet another preferred feature of the invention, the designated load correction factor is determined as a function of the load correction factors determined for each vehicle including load sensing apparatus.

According to yet another preferred aspect of the invention, the yield value correction factor and the load value correction factor is reset when the load sensing apparatus is calibrated, and the yield value correction factor is reset when the yield monitor system is calibrated.

DETAILED DESCRIPTION OF THE INVENTION

It should be noted that the invention is described below for use with cotton harvesting and transport vehicles and cotton modules. It should be noted, however, that the invention is contemplated for use with harvesting vehicles and other machinery for harvesting and/or picking up or transporting any of a wide variety of packaged plant material and biomass, and therefore is not limited to cotton, or transporters configured for loading modules from the ground, and can thus also include, for example, transporters configured for receiving a package of harvested material or module directly from a harvesting vehicle or another transport vehicle.

Figure 1:
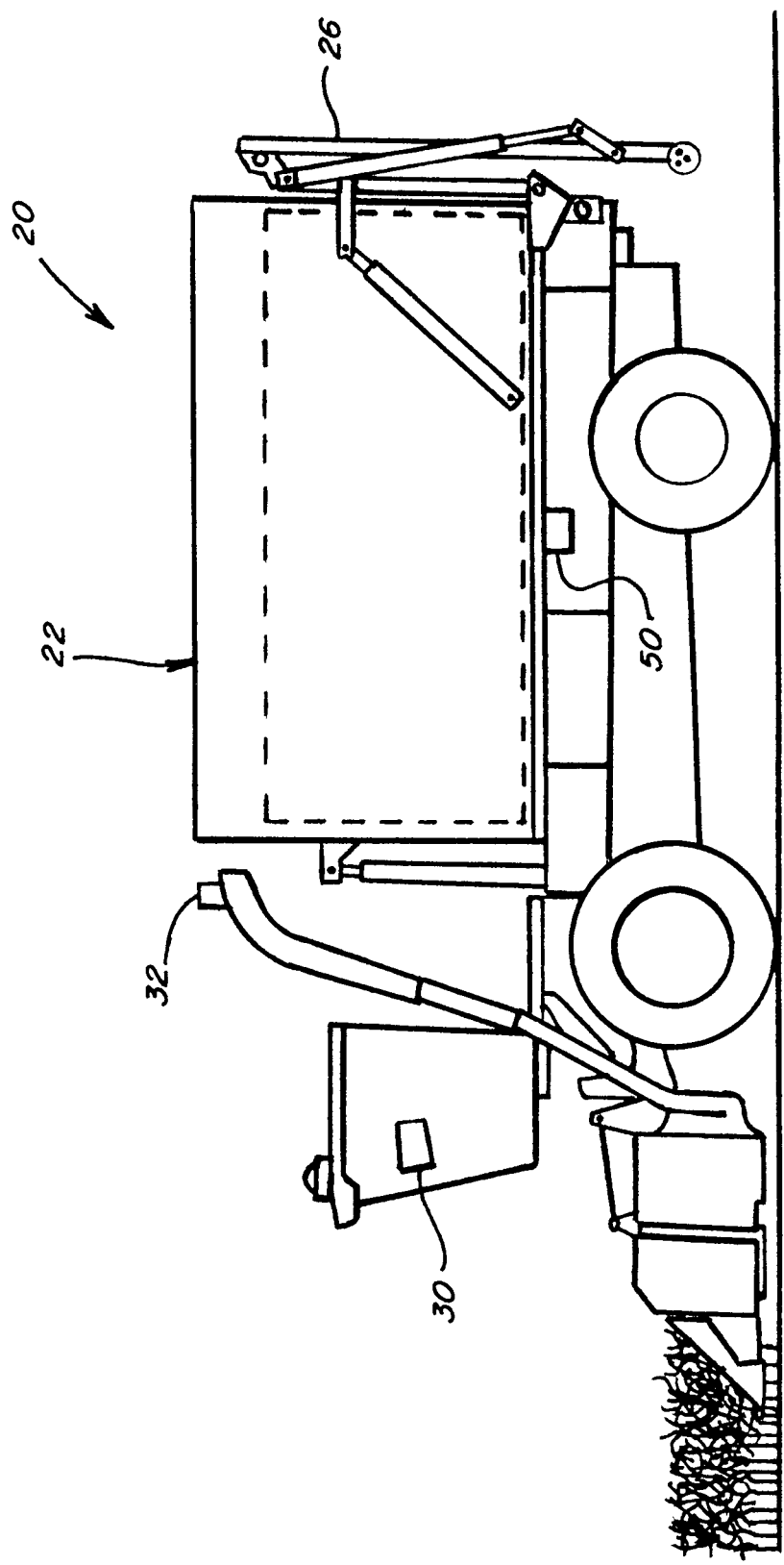
FIG. 1 is a simplified side view of a representative cotton harvesting vehicle including a cotton module builder having a foldable unloading door arrangement in a harvesting position.
Figure 2:
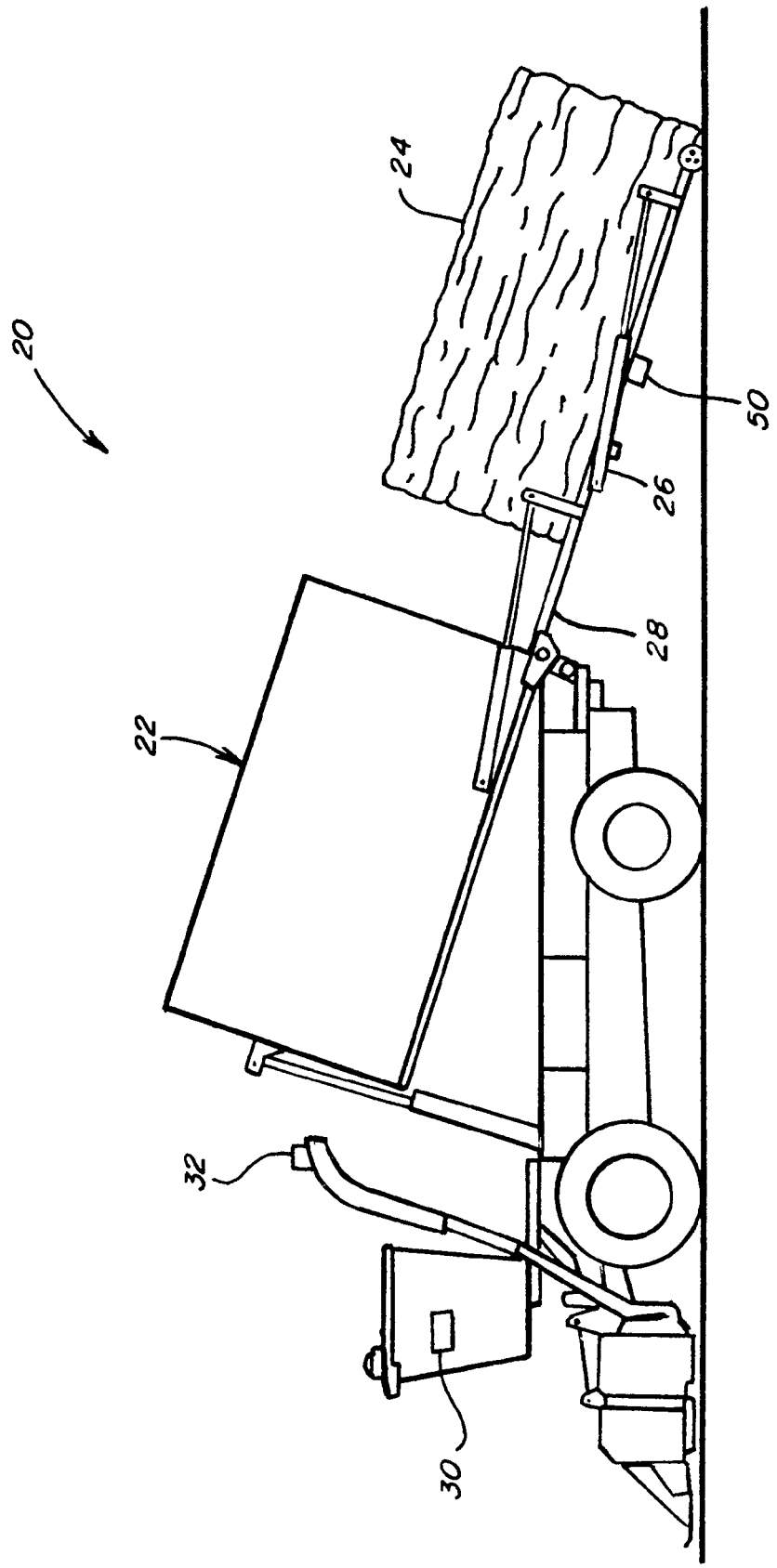
FIG. 2 is another simplified side view of the harvesting vehicle with the cotton module builder tilted and the unloading door in an unloading position.

Turning now to the drawings, wherein FIGS. 1 and 2 depict a representative cotton harvesting vehicle 20 including a cotton module builder 22 of well-known construction and operation. An unloading door or ramp 26 unfolds as cotton module builder 22 is tilted to provide a continuous level surface including a transport structure 28 for moving a cotton module 24 from cotton module builder 22 to the ground or other surface onto which it is to be unloaded. Harvesting vehicle 20 includes a yield monitor system 30 including sensor 32 which is calibrated as a function of at least one crop related parameter, such as load or weight (typically in kilograms, pounds, metric tons, bushels, or the like). Representative, but non-limiting examples of sensor 32 include a variety of optical, microwave, and load cell sensing technologies. Yield monitor system 30 is configured to automatically determine a yield value (typically in kilograms/hectare, pounds/acre, metric tons/hectare, bushels/acre, or the like) for at least one module of harvested cotton.

Figure 3:
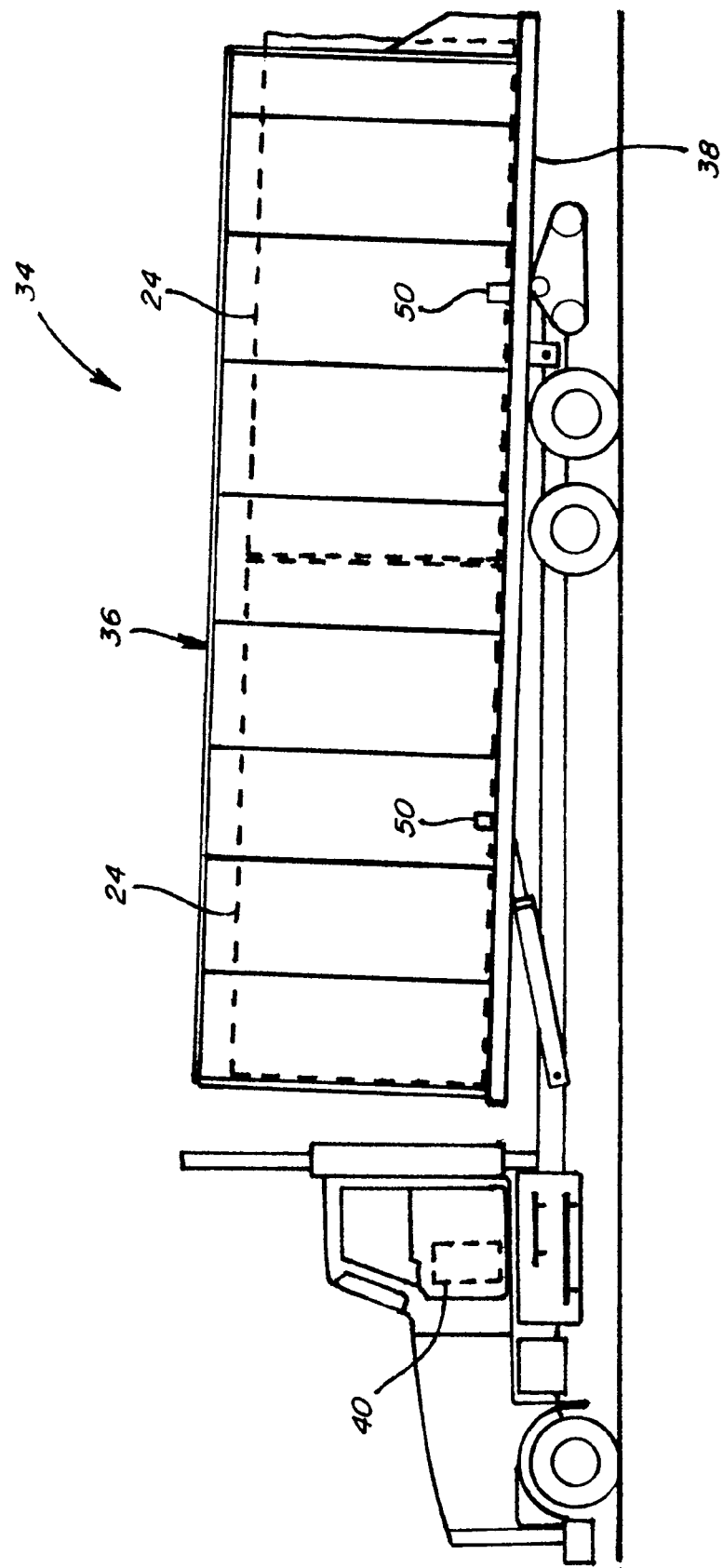
FIG. 3 is a simplified side view of a transport vehicle holding at least one cotton module in a transport position.
Figure 4:
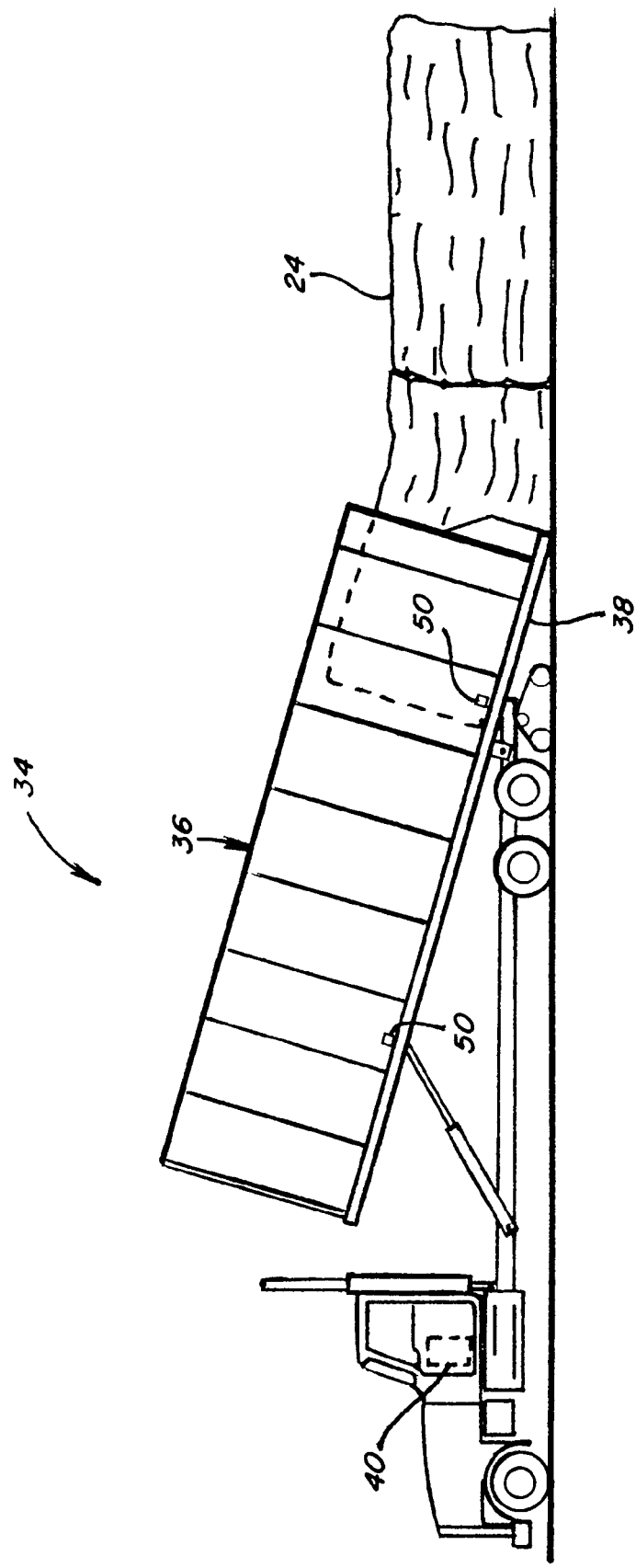
FIG. 4 is another simplified side view of the transport vehicle in a loading or unloading position.

FIGS. 3 and 4 depict a representative cotton module transport vehicle 34, also of well-known construction and operation, suitable for collecting and transporting cotton module 24. Transport vehicle 34 includes a holding area 36 for receiving and holding cotton module 24 and a transport structure 38 for loading and unloading cotton module 24 between holding area 36 and the surface onto which it is to be unloaded. Transport structures 28, 38 have suitable driver systems (not shown) which may include one or more independently controllable powered drag chains, belts, rollers, or the like.

Figure 5:
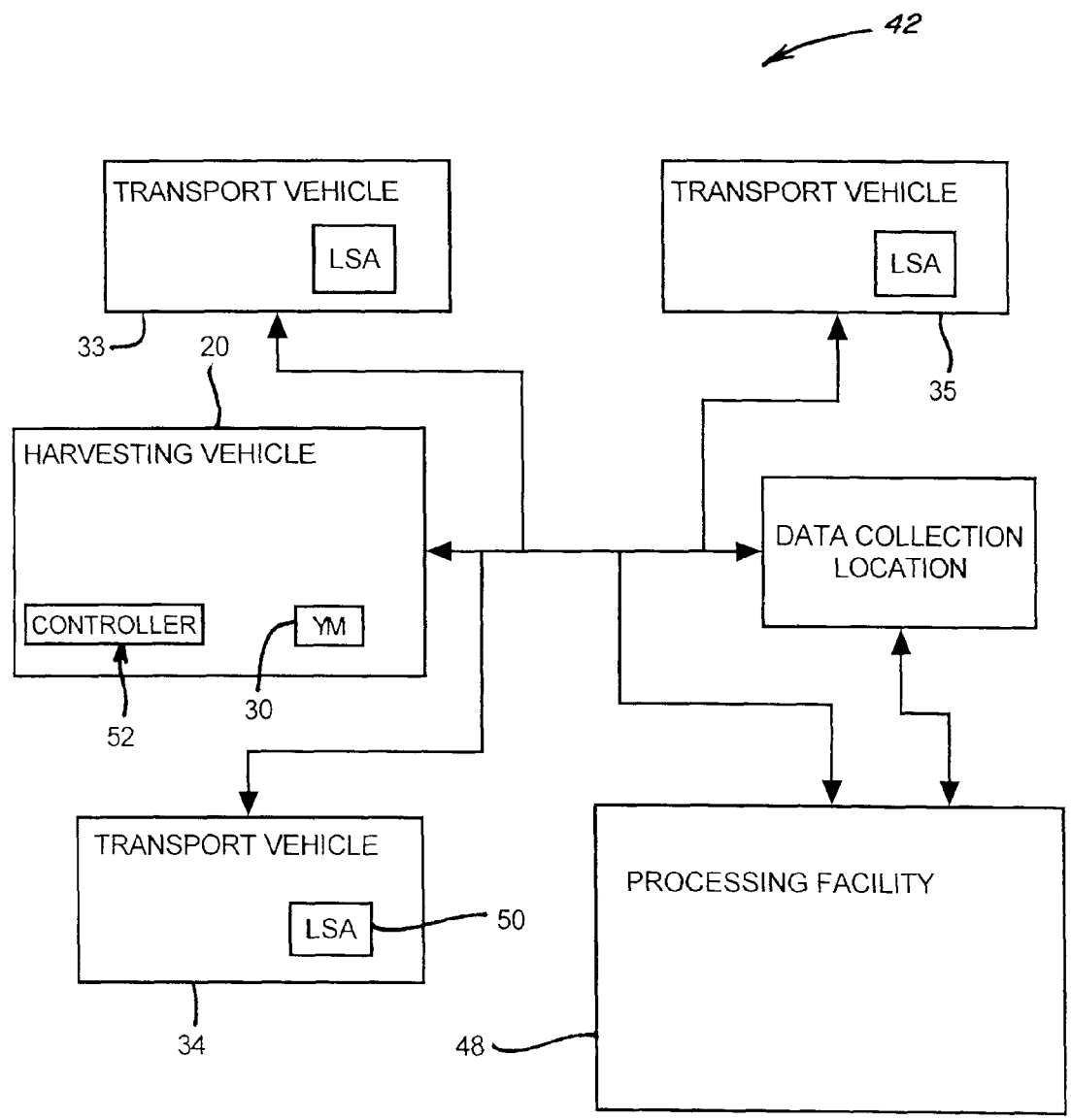
FIG. 5 is a simplified schematic representation of a preferred embodiment of the system of the present invention.
Figure 6:
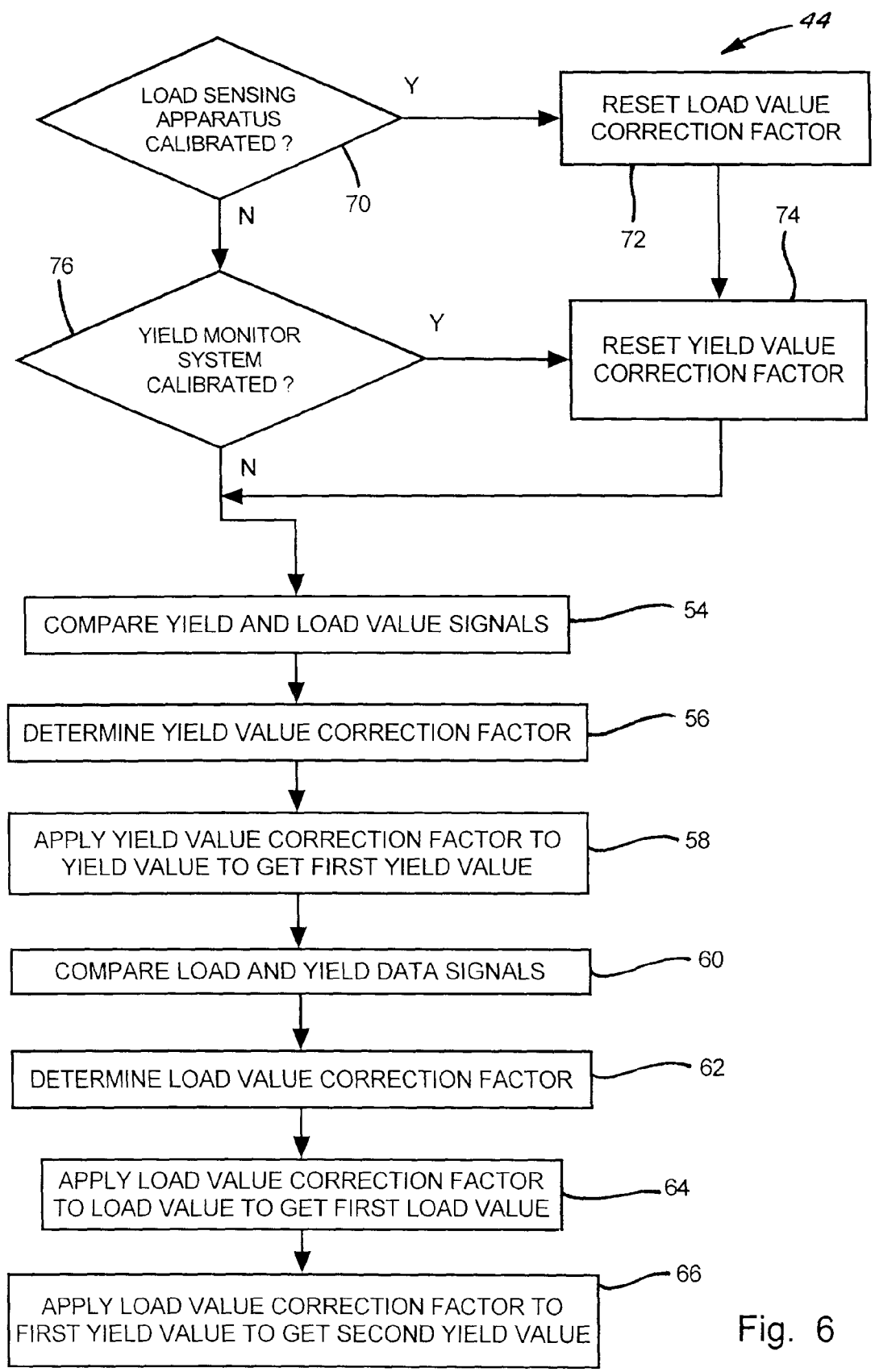
FIG. 6 is a simplified flow diagram of a portion of the control system according to the present invention.

Turning also to FIGS. 5 and 6, and according to the present invention, a system 42 and method 44 for automatically correcting yield values of a yield monitoring system 30 of harvesting vehicle 20 between calibrations of monitoring system 30 is shown. A communication network 40 is configured to communicate information between cotton harvesting vehicle 20 and the at least one transport vehicle 34 or between another apparatus, such as a weigh station or processing facility 48 and vehicles 20, 34. A load sensing apparatus 50, such as a strain gauge, or the like, is associated with at least one of the vehicles 20, 34 and is configured to determine a weight or load value of cotton module 24.

According to a preferred aspect of the invention, load sensing apparatus 50 measures the load value of the loaded cotton module. For example, one or more load sensing apparatus 50 may be associated with holding area 36 of transport vehicle 34 or module builder 22 of harvesting vehicle 20 (FIGS. 1 and 3).

According to another preferred aspect of the invention, load sensing apparatus 50 measures the load value of the cotton module as it is being loaded or unloaded. For example, at least one load sensing apparatus 50 may be associated with transport structure 38 of transport vehicle 34 or transport structure 28 of harvesting vehicle 20 (FIGS. 2 and 4).

A simplified flow diagram of a portion of method 44 is shown in FIG. 6. At block 44, control system 52 is programed to monitor and compare the yield value from yield monitor system 30 of harvesting vehicle 20 and the load value from load sensing apparatus 50 for at least one designated cotton module. A yield value correction factor is determined at block 56 as a function of the comparison of the yield value and the load value. At block 58, the yield value correction factor is applied to the yield values for the at least one designated cotton module and the cotton modules harvested thereafter.

When the at least one designated cotton module is evaluated at another apparatus, such as being weighed at the weigh station or processed at processing facility 48, yield data information is communicated to and monitored by control system 52. At block 60 the yield data from processing facility 48 is compared to the load value from load sensing apparatus 50 to determine a load value correction factor. Next, the load value correction factor is applied to the load value at blocks 64, and the load value correction factor may be applied to the previously corrected yield value as seen at block 66. The correction factors are applied to the yield value and load value for cotton modules harvested after the at least one designated cotton module until load sensing apparatus 50 or yield monitor system 30 is subsequently calibrated.

Determining and applying the load value correction factor to the load value and the yield value allows the invention to overcome the shortcomings of many prior art systems. Merely adding load sensing apparatus 50 into system 42 to make near real-time comparison of the yield value from yield monitor system 30 to the measured load value would introduce a new source of potential error or inaccuracy at load sensing apparatus 50. Comparison of the yield data from processing facility 48, however, corrects any potential error introduced. Of course, the yield data may also be compared to the original yield value from yield monitor system 30 as a second comparison.

It may be desirable to retain certain values for analysis. For example, first yield value may be defined as the value produced after applying the yield value correction factor to the yield value, and second yield value may be defined as the first yield value after applying the load value correction factor. Similarly, first load value may be defined as the load value after application of the load value correction factor. This information may provide the farmer with insight into the reliability of system hardware and software. In conjunction with a field map, this information may reveal areas of the field in which the hardware is less reliable. The farmer may also see a pattern based on number of rows harvested or length of harvest time to anticipate when calibration may be required.

When harvesting a field, several cotton harvesting vehicles 20 and transport vehicles 34 may be in use at the same time, and more than one transport vehicle 34 may transport the at least one designated cotton module prior to reaching the additional apparatus as source of yield data or processing facility 48. Referring to FIG. 5, harvesting vehicle 20 and transport vehicles 33, 34, and 35 are shown. According to a preferred feature of the invention, the load value correction factor is determined for each vehicle 20, 34 including load sensing apparatus 50 and the load value correction factor is applied to the load value of each vehicle, respectively. This feature of the invention adds redundancy to system 42 and allows for correction in control system 52 while verifying the accuracy for each load sensing apparatus 50 that provided measurements for the designated cotton module.

According to another preferred feature of the invention, a designated load value correction factor associated with a designated load sensing apparatus 50 is applied to the yield value. In other words, load value correction factors may be determined for each load sensing apparatus 50, but control system 52 may be programmed to use the load value correction factor associated with the first vehicle providing the load value measurement for the at least one designated cotton module.

According to yet another preferred feature of the invention, control system 52 is programmed to determine which load value correction factor to use when more than one vehicle provides load values. Control system 52 may, for example, determine that the load sensing apparatus of a specific transport vehicle tends to be the most accurate when compared to processing facility data. System 52 may then designate the load value correction factor associated with the specific transport vehicle be used when the specific transport vehicle provides a load value.

According to yet another preferred aspect of the invention, calibration of the hardware or software of the system 42 requires resetting of the calibration factors. Referring to FIG. 6, at blocks 70 through 76, the yield value correction factor and the load value correction factor are reset when load sensing apparatus 50 is calibrated, and the yield value correction factor is reset when yield monitor system 30 is calibrated.

It will be understood that the foregoing description is for preferred embodiments of this invention and that the invention is not limited to the specific forms shown. Other modifications may be made in the design and arrangement of other elements without departing from the scope of the invention as expressed in the appended claims.

What is claimed is:

1. A system for automatically correcting yield values of a yield monitoring system of a harvesting vehicle between calibrations of the monitoring system, comprising:
a harvesting vehicle having a transport structure configured to unload packages of harvested crop, and a yield monitor system calibrated as a function of at least one crop related parameter, configured to automatically determine a yield value;
at least one transport vehicle including a holding area for receiving and holding at least one of the packages of harvested crops and transport structure for loading and unloading the at least one of the packages;
a load sensing apparatus associated with at least one of the vehicles configured to determine weight or load values of the packages, respectively; and
a control system configured to monitor the yield value determined by the yield monitor system and the weight or load value determined by the load sensing apparatus for a designated at least one of the packages, to determine a yield value correction factor as a function thereof to apply to the yield values for the packages harvested thereafter, and to monitor yield data generated by another apparatus for the designated at least one of the packages, to determine a load value correction factor to apply to the load values for the packages harvested thereafter wherein the yield value correction factor and the load value correction factor are reset when the load sensing apparatus is calibrated, and the yield value correction factor is reset when the yield monitor system is calibrated.

2. The system of claim 1, wherein a first yield value comprises the yield value after applying the yield value correction factor.

3. The system of claim 2, wherein a first load value comprises the load value after applying the load correction factor.

4. The system of claim 2, wherein a second yield value is comprised of applying the load value correction factor to the first yield value.

5. The system of claim 1, wherein the load sensing apparatus is associated with the holding area of at least one of the vehicles.

6. The system of claim 1, wherein the load sensing apparatus is associated with the transport structure of at least one of the vehicles.

7. The system of claim 1, wherein the load value correction factor is determined for each vehicle including load sensing apparatus and the load value correction factor is applied to the load values of each vehicle, respectively.

8. The system of claim 7, wherein a designated load value correction factor associated with a designated load sensing apparatus is applied to the yield value.

9. The system of claim 8, wherein the designated load correction factor is determined as a function of the load correction factors determined for each vehicle including load sensing apparatus.

10. A method for automatically correcting yield values generated by a yield monitor system of a harvesting vehicle between calibrations of the system, comprising the steps of:
providing a harvesting vehicle having a transport structure configured to unload a discrete package of crop harvested by the harvesting vehicle;
providing a yield monitor system associated with the harvesting vehicle, calibrated as a function of at least one crop related parameter for determining crop yield information;
operating the yield monitor system to output a yield value for at least one package of harvested crop and outputting a signal representative thereof;
providing at least one transport vehicle including a. holding area for receiving and holding the package, and transport structure for loading and unloading the package;
providing a load sensing apparatus associated with at least one of the vehicles;
determining a weight or load value of the package and outputting a signal representative thereof;
providing a communication network between the harvesting vehicle and the at least one vehicle or between a processing facility and the vehicles for communication therebetween;
monitoring the yield value signals from the harvesting vehicle and the load value signals from the load sensing apparatus for at least one designated package and determining a yield value correction factor as a function thereof;
applying the yield value correction factor to the yield value for packages harvested after the at least one designated package;
receiving and monitoring signals representative of yield data from another apparatus for the at least one designated package;
determining a load value correction factor as a function of the load value signal and the yield data signal; and
applying the load value correction factor to the load value and the yield, value for packages harvested after the at least one designated package; and
resetting the yield value correction factor and the load value correction factor when the load sensing apparatus is calibrated and resetting the yield value correction factor when the yield monitor system is calibrated.

11. The method of claim 10, comprising the additional step of defining a first yield value as the yield value after applying the yield value correction factor.

12. The method of claim 11, comprising the additional step of defining a first load value as the load value after applying the load correction factor.

13. The method of claim 11, comprising the additional step of defining second yield value as the first yield value after applying the load correction factor.

14. The method of claim 10, wherein the load, sensing apparatus is associated with the holding area of at least one of the vehicles.

15. The method of claim 10, wherein the load sensing apparatus is associated with the transport structure of at least one of the vehicles.

16. The method of claim 10, comprising the additional step of determining the load value correction factor for each vehicle including load sensing apparatus and applying the load value correction factor to the load value of each vehicle, respectively.

17. The method of claim 16, comprising the additional steps of designating a designated load value correction factor associated with a designated load sensing apparatus and applying the designated load value correction factor to the yield value.

18. The method of claim 17, comprising the additional step of determining the designated load correction factor as a function of the load correction factors determined for each vehicle including load sensing apparatus.

* * * * *